Patented May 31, 1938

2,119,123

UNITED STATES PATENT OFFICE 2,119,123

CONDENSATION PRODUCTS OF THE DIPHENYLAMINE SERIES

Werner Zerweck, Frankfort-on-the-Main-Fechenheim, Norbert Steiger, Frankfort-on-the-Main, and Heinrich Ritter, Frankfort-on-the-Main-Fechenheim, Germany, assignors to General Aniline Works, Inc., New York, N. Y., a corporation of Delaware No Drawing. Application November 27, 1936, Serial No. 113,010. In Germany November 28, 1935

4 Claims. (Cl. 260—128)

This invention relates to valuable new condensation products of the diphenylamine series, more particularly to those of the general formula:

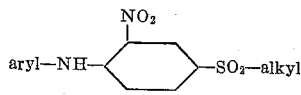

wherein aryl means a radicle of the benzene series.

The new products are obtained by condensing 1-halogeno-2-nitrobenzene-4-alkylsulfones with aromatic amines of the benzene series. They are especially useful for dyeing lacquers and acetate silk. When acetate silk is dyed with the new products according to the usual methods, bright greenish yellow to orange shades of excellent fastness properties are obtained.

The new condensation products are distinguished from the known products obtained by starting from 1-halogeno-2.4-dinitro-chlorobenzene by better fastness to light.

The 1-halogeno-2-nitrobenzene-4-alkylsulfones used as one reaction component in the present process are obtainable for instance by starting from 1-halogenobenzene-4-sulfochlorides, reducing them to the corresponding mercapto compounds, alkylating the latter and oxidizing to the corresponding sulfones. The 1-halogenobenzene-4-alkylsulfones thus obtained are finally nitrated by means of nitric acid in the presence of sulfuric acid. One may also reduce the aforesaid 1-halogenobenzene-4-sulfochlorides to the corresponding sulfinic acids, alkylate them and finally nitrate the resulting compounds in the manner described above.

Example 1

5 parts of 1-chloro-2-nitrobenzene-4-methylsulfone are mixed with about 100 parts of alcohol and 8 parts of aminobenzene and the mixture is heated to boiling for some hours in an apparatus provided with a reflux condenser. When the solution is cooled the 2-nitro-diphenylamine-4-methylsulfone formed of the formula:

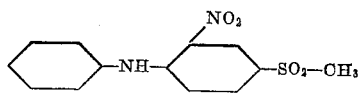

is precipitated in yellow crystals. It melts at 134–135° C. when recrystallized from alcohol and dyes acetate silk yellow shades of excellent fastness to light.

By employing 4-methoxy-1-aminobenzene instead of aminobenzene the 4'-methoxy-2-nitrodiphenylamine-4-methylsulfone of the formula:

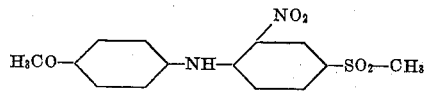

is obtained which crystallizes from alcohol in orange-yellow crystals of 174–175° C. melting point. It dyes acetate silk yellow shades of likewise excellent fastness to light.

Example 2

5 parts of 1-chloro-2-nitrobenzene-4-ethylsulfone are mixed with about 4 to 5 times the amount of aminobenzene and the mixture is heated to about 150–160° C. for a short time while stirring. Then the mixture is diluted with about 12–15 times the amount of alcohol and cooled. The 2-nitro-diphenylamine-4-ethylsulfone formed of the formula:

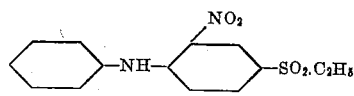

precipitates in yellow lamellas, melting at 133° C. when recrystallized from alcohol. It dyes acetate silk yellow shades of excellent fastness to light and fast to washing.

By employing 1-chloro-2-nitrobenzene-4-butylsulfone instead of the 1-chloro-2-nitrobenzene-4-ethylsulfone the 2-nitro-diphenylamine-4-butylsulfone is formed which melts at 105° C. when recrystallized from alcohol and dyes acetate silk yellow shades, fast to light.

Example 3

10 parts of 4-aminophenol and 5 parts of 1-chloro-2-nitrobenzene-4-ethylsulfone are mixed with about 150 parts of alcohol and the mixture is heated to boiling for some hours under a reflux condenser. Thereby the 4'-hydroxy-2-nitrodiphenylamine-4-ethylsulfone of the formula:

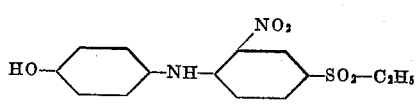

is formed. It melts at 177° C. and dyes acetate silk yellow orange shades of excellent fastness to light.

Example 4

5 parts of 1-chloro-2-nitrobenzene-4-propylsulfone are mixed with about 4–5 times the amount of 4-amino-toluene and the mixture is heated to about 150–160° C. for a short time while stirring. Then the mixture is diluted with about 100 parts of alcohol and the 4'-methyl-2-nitro-diphenylamine-4-propylsulfone formed of the formula:

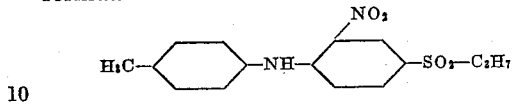

precipitates while cooling in orange colored crystals. It dyes acetate silk orange-yellow shades of excellent fastness properties.

The foregoing examples are intended to illustrate, but not to limit the invention. The parts are by weight.

We claim:

1. The condensation products of the diphenylamine series of the general formula:

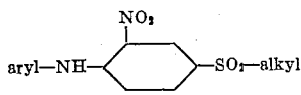

wherein aryl means a radicle of the benzene series and alkyl stands for a low alkyl radicle, which condensation products are useful for dyeing lacquers and acetate silk, whereby bright greenish yellow to orange shades of excellent fastness properties are obtained.

2. The 2-nitrodiphenylamine-4-methylsulfone of the formula:

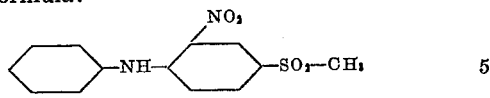

which crystallizes from alcohol in yellow crystals of 134–135° C. melting point, dyeing acetate silk yellow shades of excellent fastness to light.

3. The 4'-hydroxy-2-nitrodiphenylamine-4-ethylsulfone of the formula:

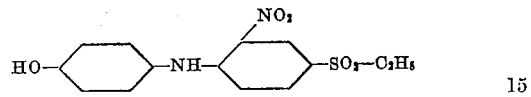

which is a crystalline powder of 177° C. melting point, dyeing acetate silk yellow-orange shades of excellent fastness to light.

4. The 4'-methyl-2-nitrodiphenylamine-4-propylsulfone of the formula:

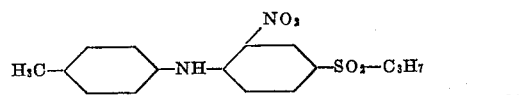

which crystallizes from alcohol in orange colored crystals, dyeing acetate silk orange-yellow shades of excellent fastness properties.

WERNER ZERWECK.
NORBERT STEIGER.
HEINRICH RITTER.